United States Patent [19]

Sciortino

[11] Patent Number: 4,503,649
[45] Date of Patent: Mar. 12, 1985

[54] MODULAR BLOCK STRUCTURES FOR BREAKWATERS, HARBOR DAMS AND THE LIKE

[76] Inventor: Joseph Sciortino, No. 42, Via S. Antonio da Padova, Rome, Italy

[21] Appl. No.: 376,052

[22] Filed: May 7, 1982

[30] Foreign Application Priority Data

May 14, 1981 [IT] Italy .................. 48473 A/81

[51] Int. Cl.³ ............. E04C 1/10; E02B 3/12
[52] U.S. Cl. ..................... 52/593; 405/16; 405/272; 405/284
[58] Field of Search ............. 52/593, 594, 590, 311, 52/687, 689; 404/34, 40, 41, 43; 405/15, 16, 29, 30, 31, 33, 35, 272, 284; 46/23, 24, 25

[56] References Cited

U.S. PATENT DOCUMENTS

| 212,072 | 2/1879 | Walker | 52/593 |
|---|---|---|---|
| 689,387 | 12/1901 | Crossland | 52/726 |
| 1,297,652 | 3/1919 | Brunner | 52/726 |
| 1,648,199 | 11/1927 | Sargent | 46/24 |
| 2,296,699 | 9/1942 | Bourdelais, Sr. et al. | 52/594 |
| 2,406,759 | 9/1946 | Glukes | 46/25 |
| 3,449,882 | 6/1969 | Ott et al. | 52/689 |
| 3,456,413 | 7/1969 | Fischer | 52/726 |
| 3,471,987 | 10/1969 | Yelsma | 52/689 |
| 3,477,167 | 11/1969 | Ach | 46/25 |
| 3,636,713 | 1/1972 | O'Neill | 405/29 |
| 3,962,817 | 6/1976 | Vullierme | 46/25 |
| 4,060,952 | 12/1977 | Hernandez | 46/25 |
| 4,372,705 | 2/1983 | Atkinson | 405/19 |

FOREIGN PATENT DOCUMENTS

| 2305601 | 8/1974 | Fed. Rep. of Germany | 404/41 |
|---|---|---|---|
| 1242746 | of 1960 | France | 46/25 |
| 2407310 | 6/1979 | France | 52/593 |
| 6800374 | 7/1969 | Netherlands | 52/594 |
| 0618477 | 8/1978 | U.S.S.R. | 405/33 |

Primary Examiner—Donald G. Kelly
Assistant Examiner—Michael Safavi
Attorney, Agent, or Firm—Beveridge, DeGrandi and Kline

[57] ABSTRACT

The invention relates to an improvement in constructions having a controllable previous structure and consisting of modular blocks for carrying out breakwaters, harbor dams and the like. Such blocks are premanufactured by casting a standard mix and include two base elements: a male element having a substantially cylindric shape and a wing arranged substantially at half height of the cylindric body provided with an open cavity arranged to embrace the cylindric element of similar blocks; a substantially female element having two open cavities arranged to embrace the cylindric body of the first blocks for carrying out an enchaining of the first type blocks in the entire construction.

11 Claims, 10 Drawing Figures

MODULAR BLOCK STRUCTURES FOR BREAKWATERS, HARBOR DAMS AND THE LIKE

DISCLOSURE

The present invention relates to an improvement in constructions having a controllable pervious structure and consisting of modular blocks for performing breakwaters, harbour dams and the like.

The construction of breakwaters, harbour dams and similar engineering marine and harbour works is an old problem, the solution of which is endeavoured since immemorial time.

After the introduction of concrete, it has been abandoned the use of the natural or shaped rocks in an ordered or random arrangement for carrying out constructions of this kind.

There are now employed precast concrete elements having several structures, which elements may be classified in two substantially different groups. The first group includes precast blocks having several shapes ranging from parallelepiped on to more complex configurations, which blocks are randomly disposed in a zone where the protection work against the waves should be built. The second group consists of blocks having a well determined shape which are placed in a correct position likely as any brick masonry work, even if of cyclopic kind, which blocks require, however, a perfect performance of the foundation, since a possible subsidence of the ground would cause an irremediable disorganization of the entire construction.

Moreover, it should be noted that the random constructions and the constructions having a well ordered bricklike structure have a behaviour which is very different with respect to the wave motion. A random type construction causes a damping of the wave configuration which form in a limited shore area with the consequent advantages for natural and artificial harbours. An ordinated construction may cause an amplification by resonance of the wave motion, but with the advantage of a well determined overall size useful in particular cases of reduced areas.

The object of the present invention is to provide a system of prefabricated modular blocks which allow to carry out marine defensive works having the advantage of both the random and ordered construction, since it renders possible to perform geometrically well defined works, which maintain both the pervious structure and property of damping the wave motion, typical for the random type structure.

According to the present invention there are provided prefabricated blocks obtained by casting cement concrete, which blocks have two essential elements: a male element consisting of substantially cylindrical body having a wing arranged substantially at a half height of said cylindrical body and provided with an open cavity so as to embrace the cylindric element of similar blocks; a second substantially female element having two open cavities provided to embrace the cylindric body of the first blocks for carrying out an enchaining of the first blocks in the entire structure.

The present invention will be now disclosed with reference to a presently preferred non limitative, illustrative embodiment shown in the figures of the enclosed drawings, in which.

Figure 1:
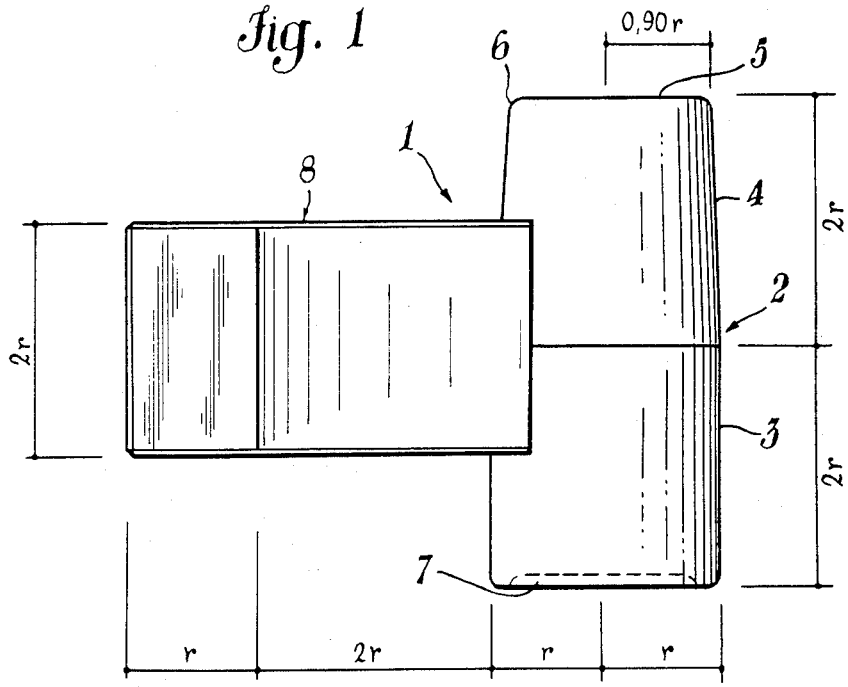
FIG. 1 is a side view of a male block according to the invention.
Figure 2:
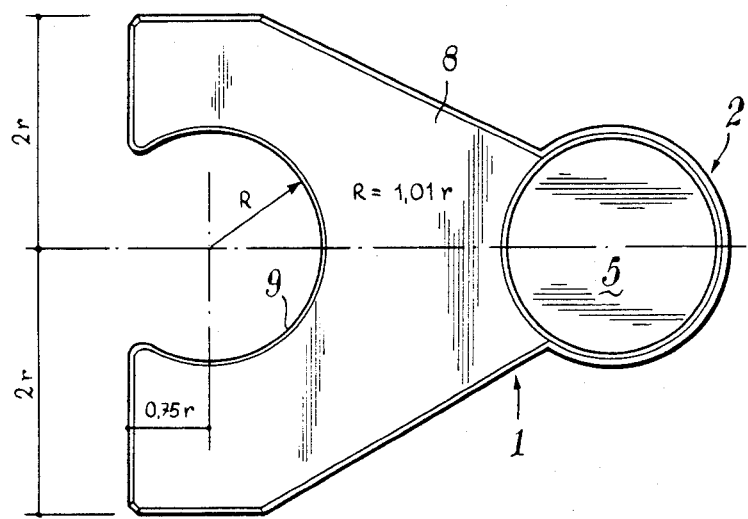
FIG. 2 shows a plan top view of the block of FIG. 1.

Referring to FIGS. 1 and 2, the male blocks according to the present invention, indicated in their whole with the reference numeral 1, comprise a past portion or cylindrical body 2 divided in two parts; a cylindric lower part 3 and an upper part 4 having a slightly conical shape. The top portion of the part 4 indicated with the reference numeral 5, is circumferentially provided with a radiused chamber 6 and has diameter adapted to engage a complementary cavity 7 provided at the lower portion of the cylindric part 3. In this way it is possible to pile up the blocks 1 so that the parts 5 and 7 engage one with another to carry out an ordered selfcentering structure.

The block 1 is provided also with a substantially V-shaped wing portion indicated in its whole with 8 and provided with an open cavity 9 having a cylindrical profile and arranged to engage and embrace the substantially cylindric body 2. In this manner it may be obtained an ordered structure, enchained in the direction of the length of the male elements 1.

Figure 3:
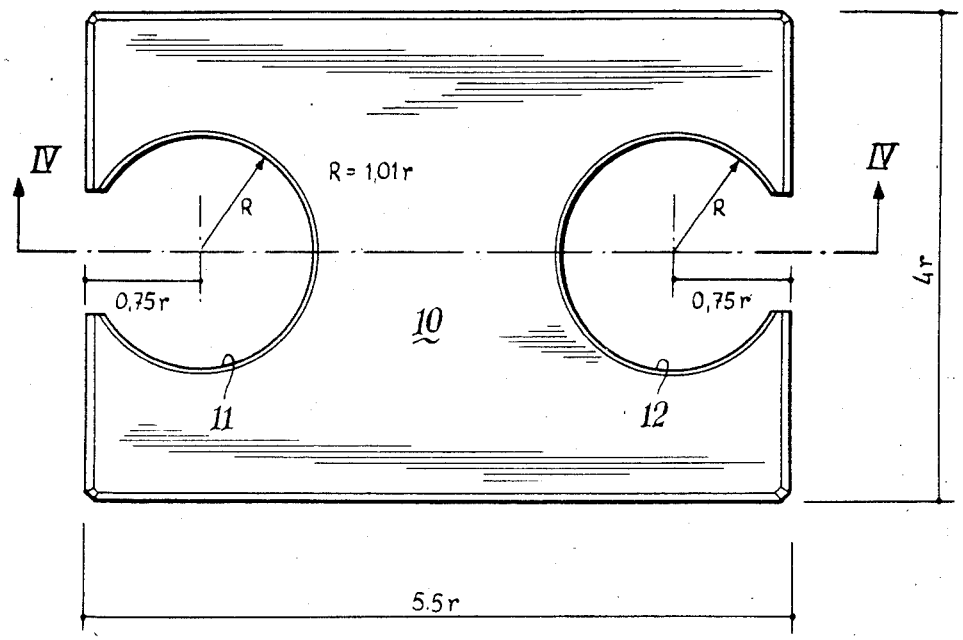
FIG. 3 is a plan top view of a female block according to the invention.
Figure 4:
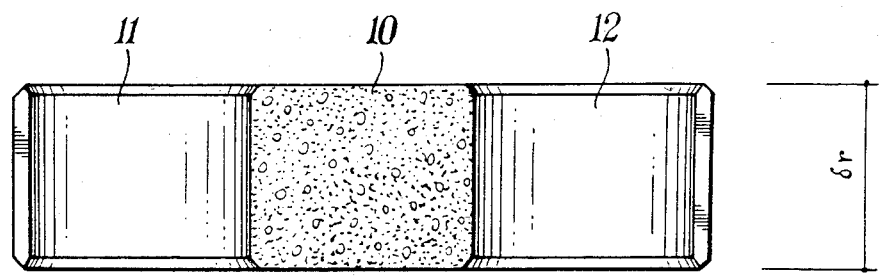
FIG. 4 shows a sectional view along the line IV—IV of FIG. 3.

The sole enchaining in the length direction is not sufficient for attaining a sufficiently strong structure and, thus, there are employed also the female blocks shown in FIGS. 3 and 4.

The female blocks indicated in their whole with 10 consist of a parallelepiped provided with two open cavities on the small faces 11, 12. The cavities 11, 12 are sized so as to engage the cylindric parts 3, 4 of the male blocks 1. In this way it is possible to attain, as it will be disclosed hereafter, a double chain structure which advantageously joins the features of a regular block masonry structure with the property to follow the settling of the sea bottom, a property which is typical for the random structures.

Figure 5:
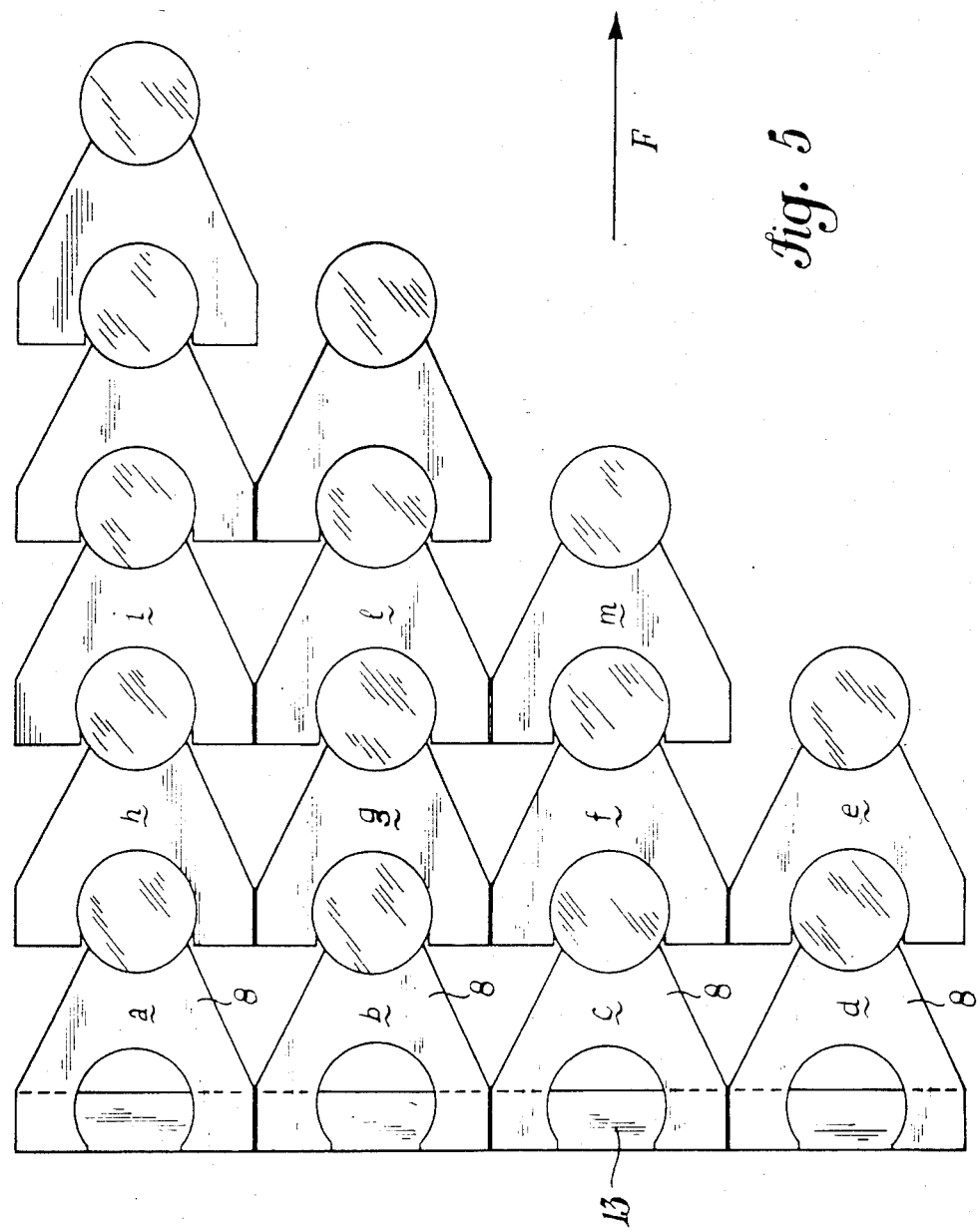
FIG. 5 is a plan view at foundation level of an assembly of interconnected male blocks according to the invention.

In FIG. 5, it is shown an arrangement of the male blocks, in which the foundation layer is placed directly on the sea bottom which has been submitted to simple levelling by dredging. As first stage, a prefabricated support beam 13 is placed for supporting the wing parts 8 of the male blocks. Thereafter, a first row of the male blocks is layed in the succession order a, b, c, d, and then a second row is layed in the succession order e, f, g, h and a third row in the succession order i, l, m . . . . The direction of placing said male blocks is indicated by the arrow F. The placing direction advances until the structure has, as its base, an established width which is calculated on the static laws.

Figure 6:
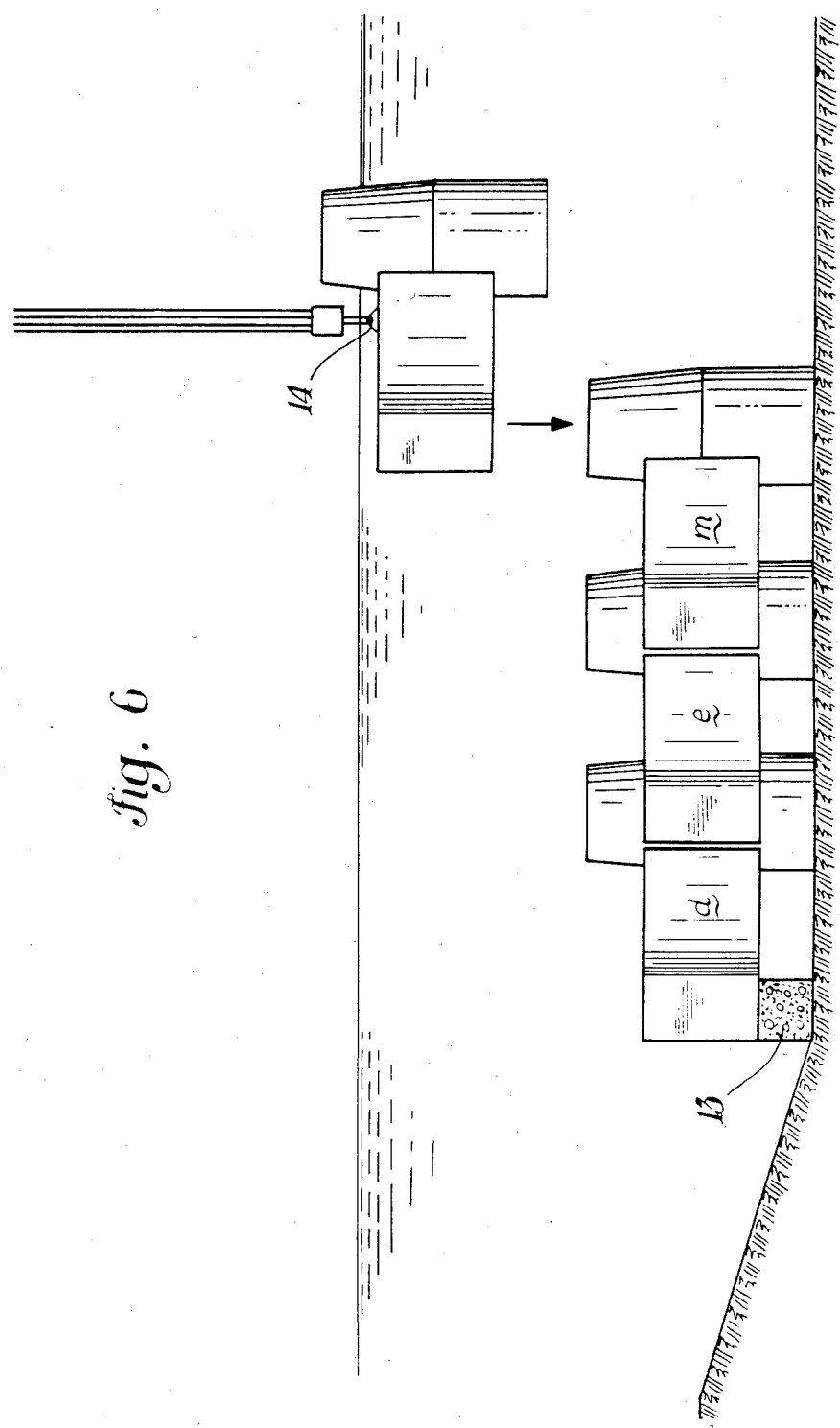
FIG. 6 shows an elevation view of the planting operations of the male blocks according to the invention.

In FIG. 6 it is shown the placing operation of the male blocks in the arrangement of FIG. 5. It may be noted that the male blocks d, e, m are placed directly on the dredged bottom by a crane which lifts the blocks by means of a hook provided at the center of gravity of the single blocks.

Figure 7:
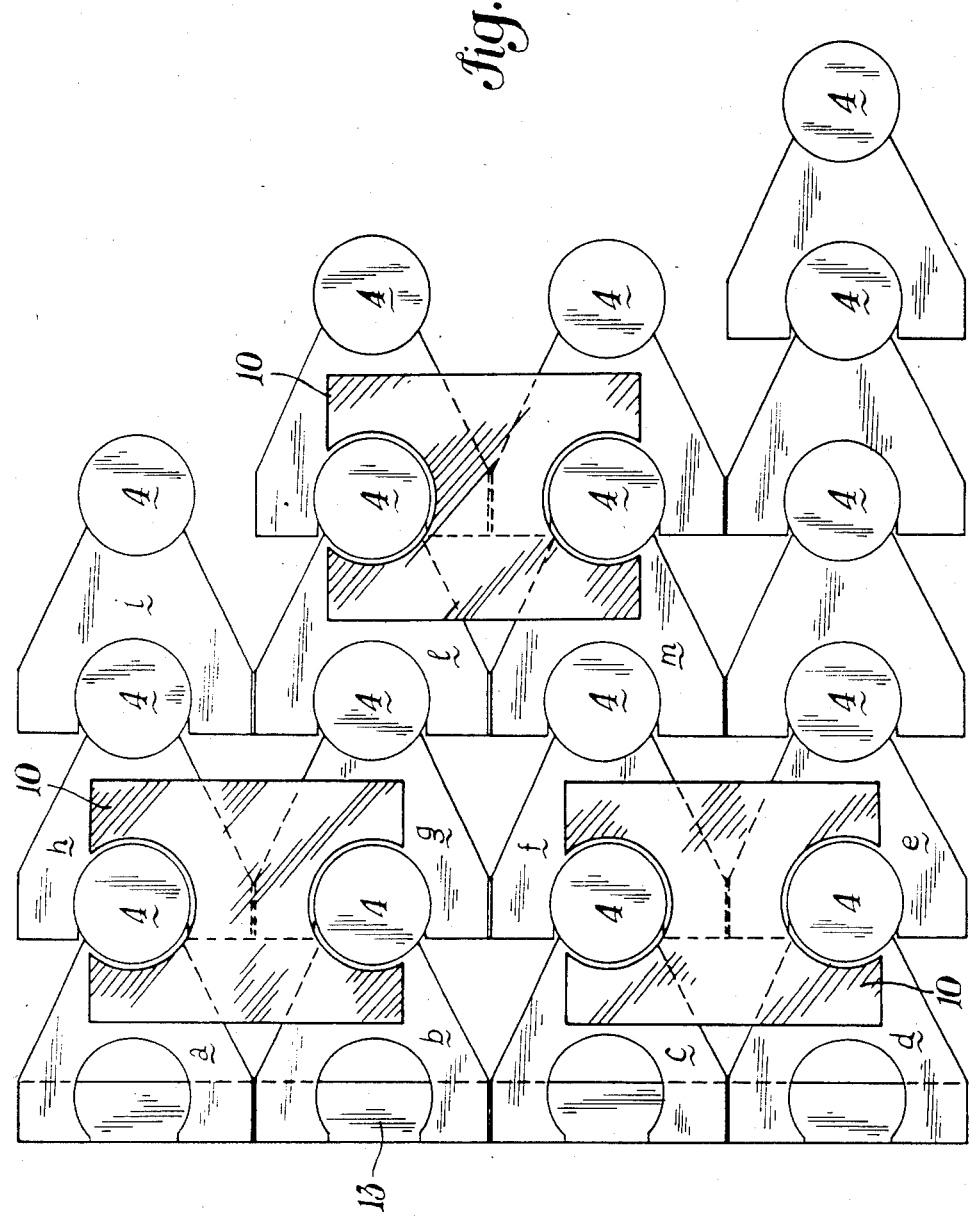
FIG. 7 shows a view similar to that of FIG. 5, but with addition of the female blocks for the mutual enchaining with the male blocks.

In FIG. 7 it is shown the arrangement of the female blocks which embrace by their cavities the cylindric parts 2 of the male blocks. It may be noted that the female blocks 10 are placed in an ordered but spread arrangement since their function is to laterally enchain the blocks 1 and to leave free spaces for rendering pervious the above said structure.

Figure 8:
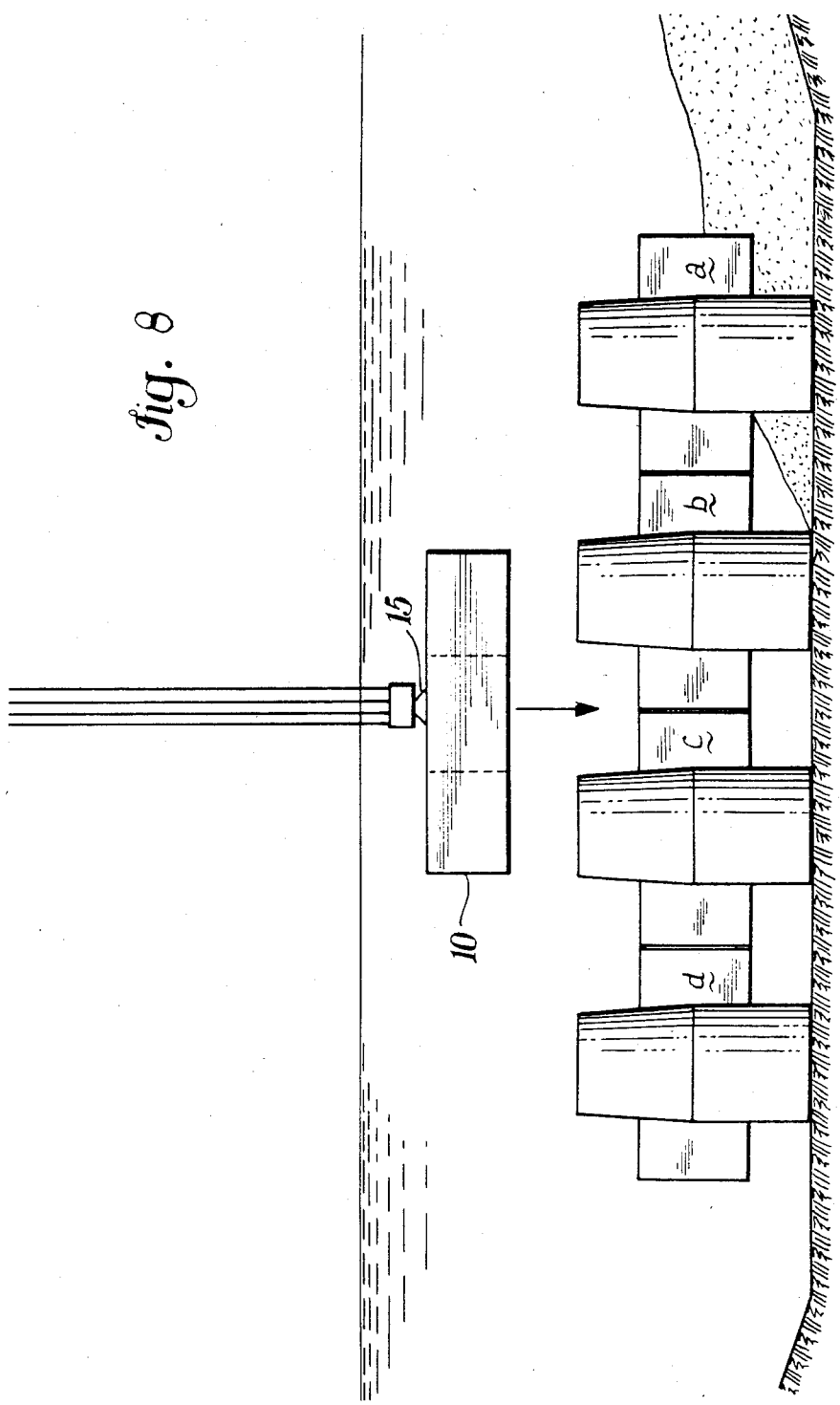
FIG. 8 is an elevation view of the planting operation of the female blocks onto the foundation plane.

In FIG. 8 it is shown the placing operation of the female blocks lifted by a crane through center of gravity hooks so that the cavities of the blocks 10 engage the cylindric parts of the blocks 1.

Figure 9:
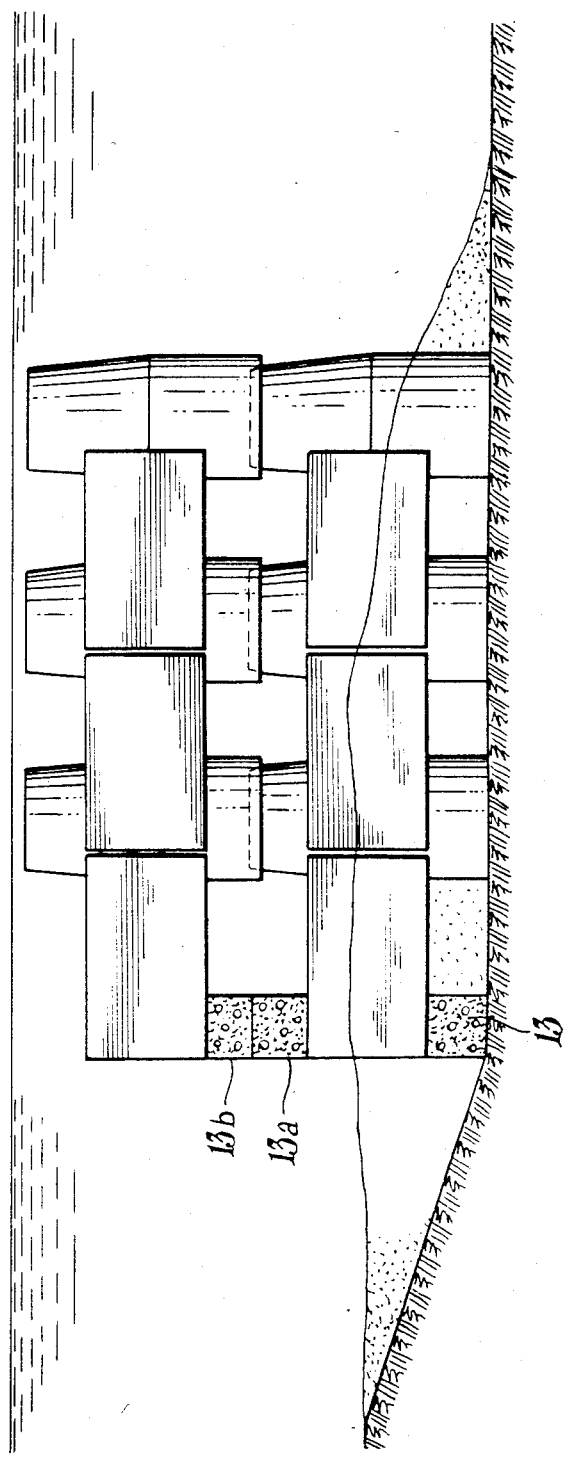
FIG. 9 shows a side view of the male blocks layed over the planting plane.

In FIG. 9 it is shown the arrangement of the male blocks in a second placing operation, that is laying thereof onto the foundation layer.

The partial structure shown in FIG. 9 is sufficiently clear and does not require a particular description. It may be only noted that in addition to the foundation beams 13 there are employed also additional spacing beams 13A, 13B.

Figure 10:
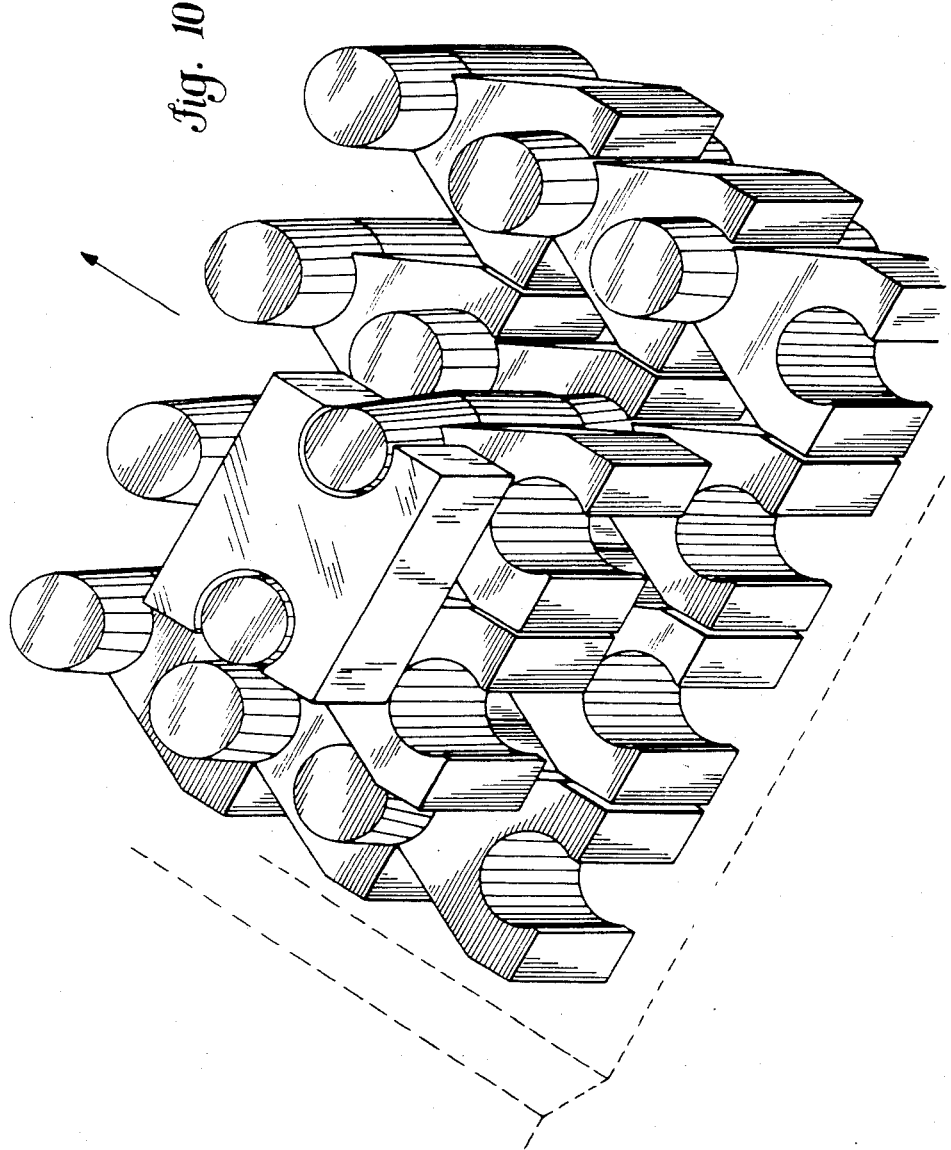
FIG. 10 is an axonometric partial view of the arrangement in case of a marine protective work.

In FIG. 10 it is shown the axonometric view of a partial structure buil with the blocks according to the invention. Also in this case a particular description is not deemed necessary.

What is claimed is:

1. A construction comprising modular blocks and having a controllable pervious structure, particularly adapted for breakwaters, harbour dams and the like, wherein said blocks are prefabricated by casting a cement concrete, characterized in that it comprises two fundamental elements: a male element having a substantially cylindrical body and a wing, said wing having a height which is less than the height of said cylindrical body and being provided with an opened cavity or recess embracing the cylindrical element of similar blocks; a second substantially female parallelepiped shaped element having two open cavities or recesses each embracing a cylindrical body of a said male element for enchaining the male elements in the whole construction.

2. A modular blocks contruction according to claim 1, characterized in that the substantially cylindrical body of said male element comprises a first lower exactly cylindrical part and a second slightly conical upper part; said exactly cylindrical part being provided with an inner cavity adapted to engage the top portion of said upper slightly conical part for carrying out a whole multi-layer construction.

3. A marine protective structure for breakwaters, harbour dams and the like having a controllable pervious structure, characterized in that it comprises the structural elements according to claim 1 or claim 2, placed in an ordered arrangement.

4. A plurality of blocks particularly adapted for forming marine structures such as breakwaters, harbour dams and the like, comprising a plurality of male blocks and a plurality of female blocks, each of said male blocks having a wing portion and a post portion, said post portion having a greater height than said wing portion so that said post portion projects vertically beyond said wing portion, said wing portion having recess means therein for receiving and engaging the post portion of another one of said male blocks, said male blocks being arranged in a plurality of adjacent parallel rows, with the male blocks in each row being connected together by interengagement of their recess means and post portions, each of said female blocks having two recess means therein for engaging said post portions of two of said male blocks which are positioned adjacent to each other, each of said female blocks having its recess means engaged with the post portions of male blocks which lie in different said rows to provide a connection between adjacent rows of said male blocks.

5. The invention of claim 4 wherein said post portion of a male block has a tapered section which projects above the wing portion, said post portion having a lower section which projects below the wing portion, said lower portion having a lower end provided with a recess which receives the tapered section of another male block positioned therebelow.

6. The invention of claim 4 wherein said blocks are interconnected to form a marine structure which is submerged in a body of water, said blocks being disposed to provide a pervious structure which has spaces between the interconnected blocks.

7. The invention of claim 4 wherein said female blocks lie in horizontal planes which include the post portions but exclude the wing portions of the male blocks.

8. The invention of claim 7 wherein said rows of male blocks have additional rows of male blocks positioned thereon.

9. A method of forming a marine structure comprising the steps of:

providing a plurality of male blocks each of which has a wing portion and a post portion, said post portion having a greater height than said wing portion so that said post portion projects vertically beyond said wing portion, said wing portion having recess means therein for receiving and engaging the post portion of another one of said male blocks;

providing a plurality of female blocks each of which has two recess means therein for engaging the post portions of two of said male blocks which are positioned adjacent to each other;

placing said male blocks in rows in positions where the recess means of one male block receives the post portion of another male block adjacent thereto, connecting the rows together by placing the female blocks in positions where the recess means of a female block receives the post portion of two male blocks which are in different said rows.

10. The method of claim 9 including the further step of placing, on said rows, additional rows of said male blocks.

11. The method of claim 10 wherein the blocks are placed so that there is a vertical space beneath the wing portions of the male blocks in the additional rows thereby the resulting structure is pervious to water.

* * * * *